United States Patent

Smulka

[11] 3,797,866
[45] Mar. 19, 1974

[54] FASTENING DEVICE FOR FASTENING A MEMBER THROUGH A HOLE IN A WALL FROM THE INSIDE SURFACE OF THE WALL

[75] Inventor: Roman Smulka, Minneapolis, Minn.
[73] Assignee: Honeywell, Inc., Minneapolis, Minn.
[22] Filed: June 7, 1972
[21] Appl. No.: 260,601

[52] U.S. Cl. .................. 285/208, 85/3 R, 285/93, 285/320
[51] Int. Cl. .............................................. F16l 5/00
[58] Field of Search ........ 85/3 R; 285/93, 205, 208, 285/320

[56] References Cited
UNITED STATES PATENTS
2,360,395  10/1944  Byron ........................ 285/208 X
1,556,345  10/1925  Pleister ....................... 85/3 R
2,638,028  5/1953   Francis ........................ 85/3 R
2,495,754  1/1950   Nance ........................ 285/320 X
3,127,808  4/1964   Drybread ..................... 85/3 R Primary Examiner—Mervin Stein
Assistant Examiner—David H. Corbin
Attorney, Agent, or Firm—Lamont B. Koontz; Clyde C. Blinn

[57] ABSTRACT

A fastening device used for fastening a pipe to a wall by inserting the pipe through a hole in the wall so that a pivoted locking device attached to the end of the pipe can change position after the pipe is inserted in the hole and rotated 180°. With such a locking device, the pipe can be removed by reversing the operation to cause the locking device to pivot back to an unlocked position so the pipe can be pulled back out of the hole in the wall.

3 Claims, 5 Drawing Figures

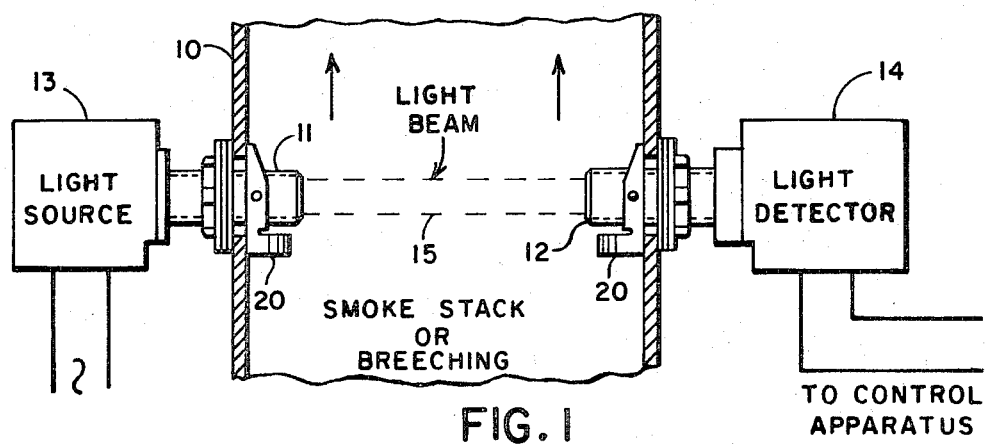
FIG. 1
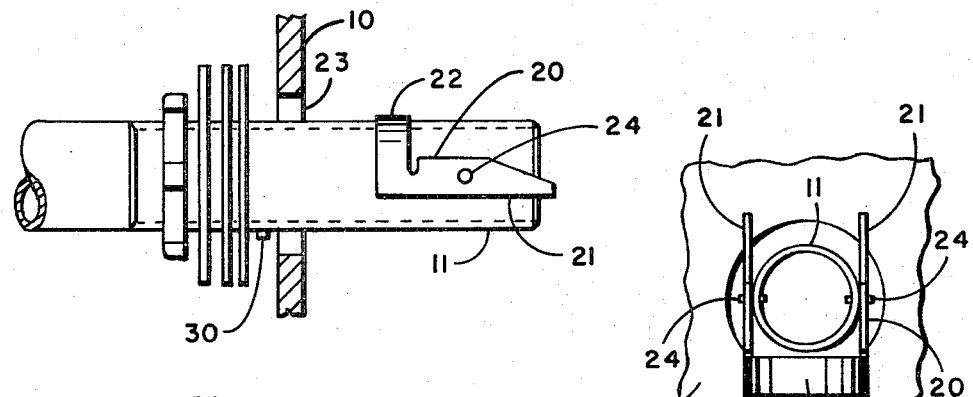
FIG. 2
FIG. 5
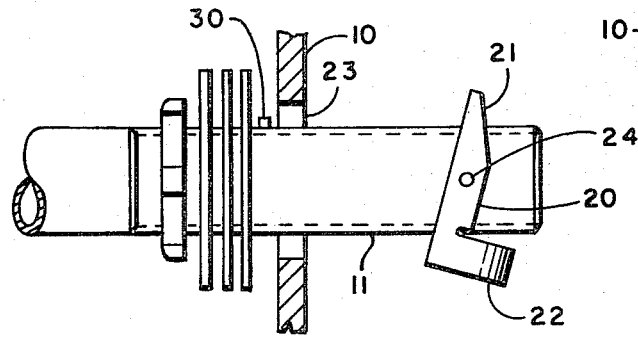
FIG. 3
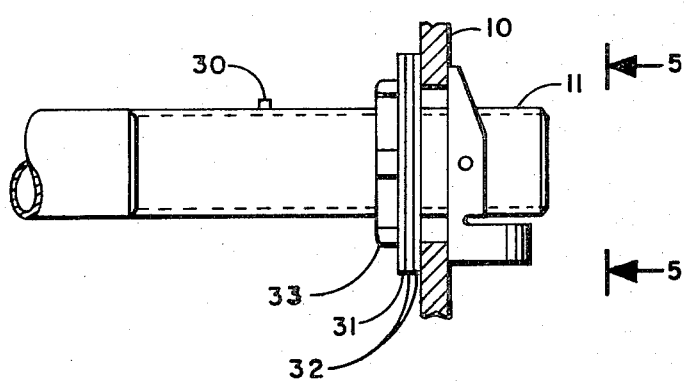
FIG. 4

FASTENING DEVICE FOR FASTENING A MEMBER THROUGH A HOLE IN A WALL FROM THE INSIDE SURFACE OF THE WALL

BACKGROUND AND SUMMARY OF THE INVENTION

In prior art smoke detecting apparatus, using a light source on one side of a smoke stack and a light detector on the other side of the smoke stack to pass a beam of light through the smoke stack, many arrangements have been used to provide for a pipe to be inserted directly on opposite sides of the smoke stack for such smoke detection apparatus. Not only need the pipe be inserted into the smoke stack without having access to the inside, but the alignment of the pipes on opposite sides of the stack to ensure that the light beam is received by the light detector has been solved by various schemes all of which have been complicated and relatively expensive.

The present invention provides a fastening device for a pipe which not only is relatively simple and inexpensive but lends itself to the simple removal operation. Should the pipes for mounting the light source and the light detector be initially misaligned, the insertion of the pipe into another hole can be easily done during the initial installation. Additionally, if after extended use of apparatuses associated with the mounted pipes, a replacement of the wall or stack is necessary, an easy removal of the pipe can result to make use of the pipes and fastening apparatus in the replacement wall or stack.

The present invention provides for the fastening of a member or pipe to a wall by a pivoted locking device attached to one end of the pipe. The locking device is unbalanced to be sensitive to the position of the pipe so that when the pipe is inserted through a hole in the wall in one position, the locking device is in an ineffective position, but upon rotation of the pipe after the locking device is on the inside of the wall, the locking device pivots to move to a position for co-operating with an exterior member or nut to clamp the pipe to the wall.

FIG. 1 is a schematic representation of smoke detecting apparatus used on a smoke stack making use of the fastening device for fastening the pipes of the light source and light detector to the wall of the stack, FIG. 2 is a showing of the locking device for a pipe in the unlocked position as the pipe is inserted into a hole in the stack, FIG. 3 is a showing of the locking device upon moving to a position adapted to lock the pipe after the pipe has been rotated 180° from the position of Figure 2, FIG. 4 is a final position of the pipe with the locking device in place to co-operate with the nut and washer on the opposite side of the wall of the stack to hold the pipe in position, and FIG. 5 is a showing of the locking device from inside the stack at the device of Figure 4.

DESCRIPTION OF THE INVENTION

Referring to Figure 1, the schematic showing of the use of the present invention has a smoke stack or breeching wall through which pipes 11 and 12 are inserted to hold a light source 13 and a light detector 14 making up a part of a smoke detection system for controlling suitable control apparatus. When pipes 11 and 12 are inserted into the wall of the stack 10, the pipes must be on opposite sides of the stack and in alignment so that the light beam 15 will pass from light source 13 to light detector 14. In the installation of such pipes, often the first pipe is mounted in the stack for one unit, and upon placement of the pipe for the other unit, a misalignment of the opposite pipes is found to exist resulting in a movement of one pipe to another position.

With the fastening means making use of the pivoted locking device 20 on each of the pipes, the pipe can be inserted into a hole of the wall and if the position of the hole is not correct the pipe can be easily removed and another selection can be made.

Locking device 20 comprises a U-shaped member having a pair of legs 21 (one of which is shown in Figure 2 as the other leg is identical and on the opposite side of pipe 11) and a connecting portion or heavy end member 22 extending over and engaging the pipe. Connecting portion 22 is formed to the contour of the pipe to reduce the projection of the locking device 20 from the surface of the pipe to a minimum amount so the pipe can be inserted into the hole 23 of wall 10 without making the hole 23 too large. Locking device 20 is pivotally connected by pins 24 on opposite sides of pipe 11 to the legs 21 as shown in Figure 5. Connecting portion 22 is heavier causing a force in a counterclockwise direction to hold the locking device in the position as shown in Figure 2 with connection portion 22 adjacent the pipe 11.

By means of a suitable mark 30 on the pipes 11 and 12 to identify the position of locking device 20, after the pipe is inserted into the hole 23 as shown in Figure 2, pipe 11 is rotated 180° so the mark 30 is on top of the pipe. The heavy end member 22 of locking device 20 causes a rotation of the device 20 into the position as shown in Figure 3. Thereafter the pipe can be partially withdrawn and with the co-operating flange 31 gaskets 32 and nut 33 the pipe is clamped to the wall 10, to be held in a fixed position as shown in Figures 4 and 5.

If a removal of the pipe is desired, such as for a mistaken location of the hole or a replacement of the smoke stack 10, the nut 32 can be loosened and by a reverse operation, locking device 20 can be moved to the unlocked position for the removal of the pipe from the hole. Portion 22 provides for a stop to limit the movement of device 20 between the positions shown in Figure 2 and Figure 5 which are approximately 90° apart; so that when pipe 11 is rotated to the position of Figure 2, device 22 will only be able to move clockwise to the position shown.

The embodiments of the invention in which an exclusive property or right is claimed are defined as follows:

1. A fastening means for a pipe adapted to be mounted through a hole in a wall without having access to the inside of the wall so a light beam can be passed through the pipe from one side of the wall to another side, comprising, a pipe adapted to be inserted in a hole in a wall from one side of the wall, a pivotal locking means having two legs and a connecting portion attached at one end of said legs, and pivot means spaced from said connecting portion and operably connecting said legs to the outside of said pipe on opposite sides thereof and at a predetermined distance from one end thereof depending upon the length of pipe to be inserted beyond the wall so a light beam can pass through said pipe, said pivot means being disposed such that when said locking means pivots about said pivot means, said connecting portion engages said pipe at a position disposed a greater distance from said one end of said pipe than siad predetermined distance and at another position disposed a smaller distance from said one end of said pipe than said predetermined distance, one end of said locking means being sufficiently heavier than the other end thereof to unbalance said locking means relative to said pivot means so that said connecting portion engages said pipe in said two positions of said locking means to limit its movement to approximately 90° between said two positions, whereby as a heavier end of said locking means moves below said pipe as the pipe is rotated from a first to a second position said locking means moves 90° from a position engaging said pipe to a locking position and as said heavier end of said locking means moves above said pipe as the pipe is rotated from said second back to said first position, said locking means can only return to said first position to engage said pipe.

2. The invention of claim 1 wherein, said locking means has a co-operating device attached to said pipe and adapted to be mounted against the wall by clamping the wall between said locking means when in said locking position on an inside surface of the wall and said co-operating device on an opposite side of the wall.

3. The invention of claim 2 wherein said connecting portion of said locking means is shaped to conform to and engage the surface of said pipe when in said first of said two positions to restrain movement of said locking means beyond one of said two positions whereby said locking means is close to said pipe to require a minimum diameter for the hole in the wall.

* * * * *